E. VIERTEL.
PLANT FOR MANUFACTURING LAMPBLACK.
APPLICATION FILED AUG. 17, 1915.
1,338,268.
Patented Apr. 27, 1920.
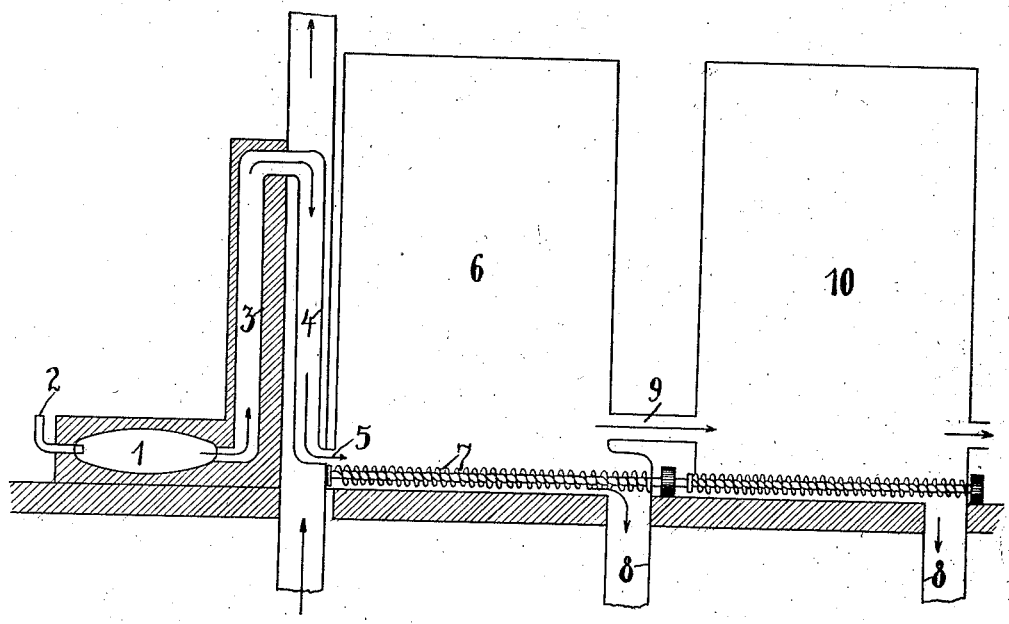
Inventor
Eduard Viertel
By Knight Bros.
Attorneys

UNITED STATES PATENT OFFICE.

EDUARD VIERTEL, OF BERLIN-TREPTOW, GERMANY, ASSIGNOR, BY MESNE ASSIGNMENTS, TO THE CHEMICAL FOUNDATION, INC., A CORPORATION OF DELAWARE.

PLANT FOR MANUFACTURING LAMPBLACK.

1,338,268.     Specification of Letters Patent.     Patented Apr. 27, 1920.

Application filed August 17, 1915. Serial No. 47,014.

*To all whom it may concern:*

Be it known that I, EDUARD VIERTEL, a German citizen, and resident of Berlin-Treptow, Germany, have invented certain new and useful Improvements in Plants for Manufacturing Lampblack, of which the following is a specification.

My invention refers to the manufacture of lamp black and more particularly to improvements in the plants used in connection with it. In the plants now in use substances adapted to furnish, upon being decomposed, pure carbon in the form of lamp black, are burnt in a combustion chamber, and the products of combustion, or smoke gases, are caused to pass into chambers confined between walls of masonry, there to deposit the finely divided carbon called lamp black, which is then scraped off the brick walls.

The bricks soon accumulate a great amount of heat which delays the deposition of the finely divided carbon. Moreover in scraping the deposit off the walls particles of the wall material, such as burnt clay and the like, are mixed with the carbon and render it impure. The poor yield obtained with brick chambers owing to the heat stored in their walls necessitates employing chambers of excessive dimensions.

According to my invention I replace the brick-wall chambers by chambers constructed of a metal which is, a good conductor of heat and not attacked by the smoke gases. The only metal which fully corresponds to the above conditions is lead and I prefer using a lead chamber or lead and I prefer using chambers for the chambers as depositing chambers for the finely divided carbon or lamp black. In order to protect the lead walls from the effects of excessive heat and to improve at the same time the yield of lamp black, I prefer cooling the smoke gases before they enter the lead chamber, their lower temperature being of advantage also in this sense that no whirls are formed within the chamber which would prevent the light particles of carbon from quickly depositing on the walls and the bottom of the chamber.

In the drawings accompanying this specification and forming part thereof, I have shown the preferred form of a lamp black manufacturing plant according to my invention, the showing being a purely diagrammatic one.

Referring to the drawing, 1 is the combustion furnace, 2 is a pipe for introducing tar oil or the like, 3, 4 is a flue connecting the combustion furnace to the depositing chambers, 5 is a cooling tube fed with water and surrounding the descending branch 4 of said flue, 6 is the first lead chamber having its walls and bottom made of sheets of lead, 7 is a conveyer worm, 8 is a shaft adapted to receive the lamp black deposited on the bottom of the lead chamber and ejected by the said worm, 9 is a tube or channel connecting said lead chamber to another lead chamber 10 of similar construction.

In the flue 3 and 4 the smoke gases formed by combustion in the furnace 1 are subjected to an effective cooling, the main part of the cooling action taking place in the descending branch 4 through the action of the water fed into the cooling jacket 5 from below. This subdivision of the smoke gas flue into an ascending branch surrounded by masonry and a descending branch cooled by water and leading to the depositing chamber, is made for the purpose of preventing the incomplete decomposition of the smoke gases. In the plant described the decomposition will take place substantially completely within the ascending branch 3 of the flue and the decomposed gases laden with finely divided carbon will be subjected to the effective cooling action of the water in the descending branch 4 of the flue before entering the lead chamber. Thus the gases leaving the furnace at a temperature of from 600 to 900 degrees C will, after having passed the descending branch 4 of the flue have suffered a drop of temperature of 400 to 500 degrees C, their temperature upon entering the lead chamber being only 200 to 400 degrees C. The differences of temperature prevailing within the flue 3, 4 also tend to increase the velocity of the gases, thus preventing the carbon formed from depositing on the walls of the flue.

After having deposited most of the carbon within the lead chamber 6, the gases then pass through the channel or tube 9 into another lead chamber 10 where the rest of the carbon is deposited. The carbon or lamp black is caused, by aid of the conveyer worm (which may be operated by hand or by any mechanical force) to pass into the shaft 8.

The lamp black obtained in a plant of this description is superior in quality to the product obtained in brick chambers on account of its superior purity, and owing to the more effective cooling action the yield of lamp black is improved as well.

I wish it to be understood that the particular arrangement of the cooling flue shown in the drawings is merely meant to be an example of a cooling means adapted to be employed in connection with my invention and any other suitable kind of cooling means may be substituted for it. Instead of employing sheets of lead in the construction of my improved depositing chambers, I may also employ sheet iron lined or coated with lead.

I claim:—

1. A lamp black manufacturing plant comprising a lead chamber.

2. A lamp black manufacturing plant comprising a chamber formed by walls of a metal not attacked by smoke gases and means adjacent to the inlet of said chamber for cooling said gases.

3. A lamp black manufacturing plant comprising a lead chamber, and means adjacent to the inlet of said chamber for cooling said gases.

4. In a lamp black manufacturing plant in combination a combustion furnace, a lead chamber, a flue connecting said furnace to said chamber, and cooling means connected to the part of the flue adjacent to said chamber.

5. In a lamp black manufacturing plant in combination a combustion furnace, a lead chamber, a flue connecting said chamber to said furnace, said flue comprising an ascending branch adjacent to the furnace and a descending branch adjacent to the chamber, and means for cooling the descending branch of said flue.

EDUARD VIERTEL.